United States Patent [19]
Suzuki et al.

[11] Patent Number: 5,544,074
[45] Date of Patent: Aug. 6, 1996

[54] METHOD AND APPARATUS FOR DETECTING THE POSITION OF AN ABNORMAL SITE OF A BURIED PIPE

[75] Inventors: Takehiko Suzuki, Yamato; Shozo Taniguchi, Tokyo; Kohji Kanemaru, Yokohama; Yoshiyuki Sato, Tokyo; Akihiko Enamito, Chigasaki, all of Japan

[73] Assignee: Kabushiki Kaisha Toshiba, Kawasaki, Japan

[21] Appl. No.: 378,935

[22] Filed: Jan. 26, 1995

Related U.S. Application Data

[63] Continuation of Ser. No. 5,132, Jan. 15, 1993, abandoned.

[30] Foreign Application Priority Data

Jan. 16, 1992 [JP] Japan ................................. 4-005893

[51] Int. Cl.⁶ ........................................... G01F 1/66
[52] U.S. Cl. ................... 364/508; 324/337; 73/40.5 A; 73/170.13; 73/861.25; 73/861.26
[58] Field of Search .................. 364/508; 73/40.5 A, 73/170.13, 861.25, 861.26, 861.31; 324/329, 337; 405/157

[56] References Cited

U.S. PATENT DOCUMENTS

| | | | |
|---|---|---|---|
| 3,055,209 | 9/1962 | Reid et al. | 73/40.5 A |
| 3,838,593 | 10/1974 | Thompson et al. | 73/40.5 A |
| 3,967,282 | 6/1976 | Young et al. | 324/329 |
| 4,083,229 | 4/1978 | Anway | 73/592 |
| 4,172,379 | 10/1979 | van Tilburg et al. | 73/40.5 A |
| 4,253,167 | 2/1981 | Flournoy et al. | 73/40.5 A |
| 4,289,019 | 9/1981 | Claytor | 73/40.5 A |
| 4,327,576 | 5/1982 | Dickey et al. | 73/40.5 A |
| 4,372,151 | 2/1983 | Maraviev et al. | 73/40.5A |
| 4,416,145 | 11/1983 | Goodman et al. | 73/40.5 A |
| 4,435,974 | 3/1984 | Fuchs et al. | 73/40.5 A |
| 4,676,695 | 6/1987 | Duthweiler | 405/157 |
| 4,747,309 | 5/1988 | Weir | 73/655 |
| 4,812,850 | 3/1989 | Gunton et al. | 324/329 |
| 4,856,321 | 8/1989 | Smalling et al. | 73/40.5 A |
| 4,858,462 | 8/1989 | Coulter et al. | 73/40.5 A |
| 4,996,879 | 3/1991 | Kruka et al. | 73/592 |
| 5,161,408 | 11/1992 | McRae et al. | 73/40.7 |
| 5,349,568 | 9/1994 | Kupperman et al. | 367/125 |
| 5,416,727 | 5/1995 | Savic | 364/509 |

FOREIGN PATENT DOCUMENTS 58-208636  12/1983  Japan.

OTHER PUBLICATIONS

Technisches Messen TM, vol. 55, No. 7–8, 1988, pp. 279–285, H. Schwarze, et al., "RECHNERGESTUTZTES MESSYSTEM ZUR AUTON. ROHRNETZUBERW. U. LECKSUCHE".

Keisoku to Seigyo: Measuring and Controlling, vol. 6, No. 1, Sep. 26, 1966, pp. 3–10, T. Hashimoto, et al., "A New Method of Water Leak Detection".

*Primary Examiner*—Emanuel T. Voeltz
*Assistant Examiner*—Patrick J. Assouad
*Attorney, Agent, or Firm*—Oblon, Spivak, McClelland, Maier & Neustadt, P.C.

[57] ABSTRACT

A device for detecting the position of a physical defect on a buried pipe includes a leak-of-fluid signal detector, a number of vibration signal detectors, and a device body and can detect the position of a site of a leak, into the ground, of a fluid running through a fluid pipe buried beneath the ground surface. The device body calculates vibration amplitudes and speeds via associated vibration signal detectors with the use of the outputs of the respective vibration signal detectors, calculates cross-correlation functions of the vibration amplitudes and speeds with the use of the vibration amplitudes and speeds and the output of the leak-of-fluid signal detector, calculates the amplitude intensity for each cross-correlation function, and generates resultant vector data representing the position of the leak-of-fluid site with the use of the vibration intensity.

23 Claims, 9 Drawing Sheets

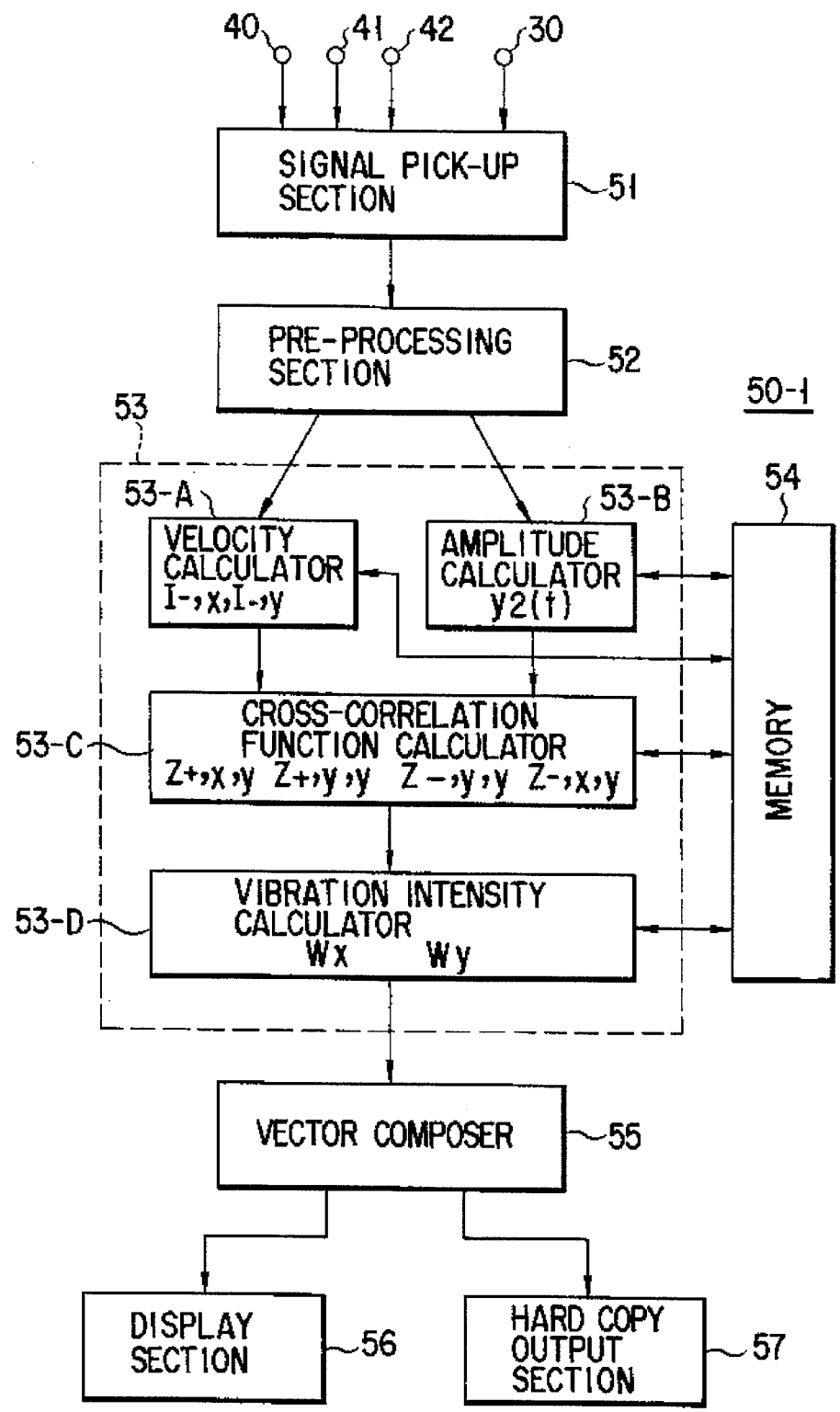
F I G. 3

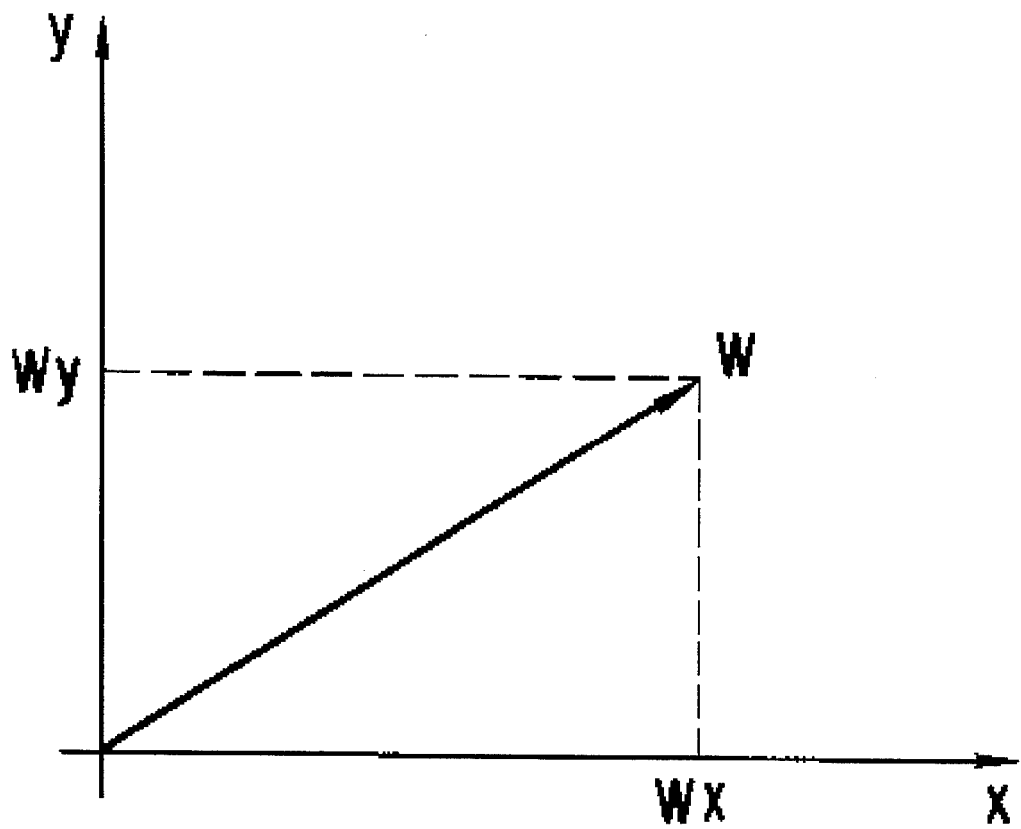
F I G. 4

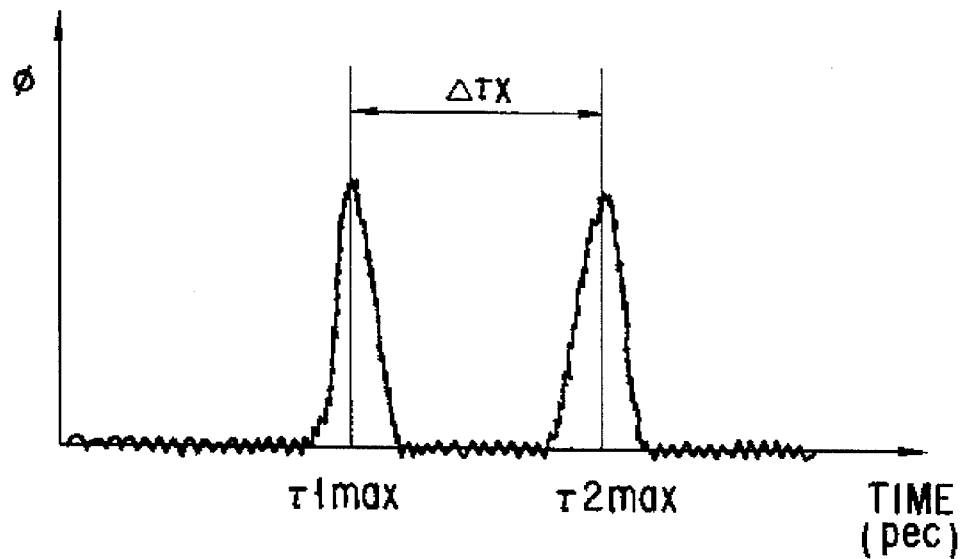
F I G. 7
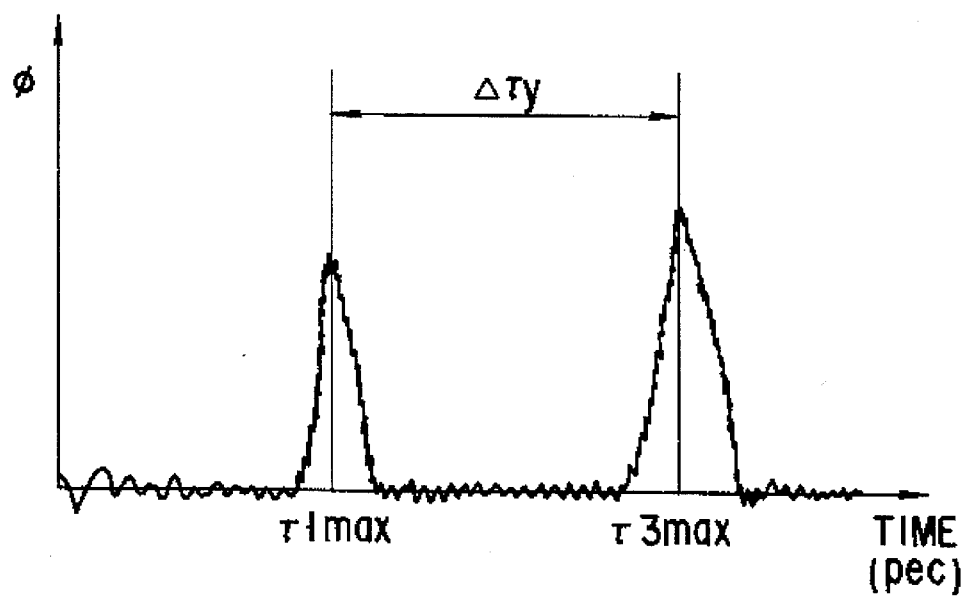
F I G. 8

METHOD AND APPARATUS FOR DETECTING THE POSITION OF AN ABNORMAL SITE OF A BURIED PIPE

This application is a continuation application Ser. No. 08/005,132, filed on Jan. 15, 1993, now abandoned.

BACKGROUND OF THE INVENTION

1. Field of the Invention

The present invention relates to a method and apparatus for detecting the position of an abnormal site such as a crack, in a pipe buried beneath the ground surface.

2. Description of the Related Art

A pipe, such as a metal pipe, is used to allow passage of a fluid, such as a gas, oil, chemicals, potable water, or a liquid such as sewage water. If there occur an abnormal site such as a crack in this type of pipe, then a fluid leaks at these sites, thus causing a waste of valuable resources. It is of advantage from the standpoint of the effective utilization of the resources to detect and repair such a leak-of-fluid site or sites. Some pipes are buried or laid beneath the ground surface and it is, therefore, difficult to locate such a site or sites from the surface of the ground.

This problem will be explained below, in more detail, in conjunction with the detection of a site of a leak, into the ground, of water running through a water service pipe or main for instance. Usually, the water service pipe is buried or laid underneath the ground surface and, if there occur cracks or broken sites in the water pipe due to their being worn out etc., with the passage of time, water leaks out of such sites on the water pipe. Water permeated or penetrated, as leak water, out of the water pipe into the ground often reaches a huge amount as a whole. In the dry season, the shortage of water becomes a grave social problem in recent times. It is, therefore, very important, from the standpoint of acquiring the water resources, to make the leak of water at as low a level as possible.

The detection of a leak-of-water site has thus far been achieved by a skilled operator at, for example, a valve-mounted site on the water pipe through the listening of the nature of water sound. Since this requires the sense of acute hearing or experiences, it has been usual practices to make such detection at a midnight when there is less external noise, such as vibrations originating from running automobiles on the street.

In the case where the leak of the water out of the water pipe is identified, the operator moves along the water pipe, while holding an acoustic microphone, so as to locate the loudest leak-of-water sound site. If this site is so located, then the operator digs up the most likely area of the ground to see whether or not water leaks out of the water pipe. In this way, necessary repairs are done if the water leaks there.

That is, the detection of a leak-of-water site is so done at such a midnight through the accumulated experiences of the skilled operator, thus very much lowering an operation efficiency involved. It is also difficult to locate that leak-of-water site.

SUMMARY OF THE INVENTION

It is accordingly the object of the present invention to provide a method and apparatus which can solve the aforementioned problem and can readily detect or locate the position of an abnormal site in a pipe buried the ground without relying upon the hearing acuity of a human being.

This object of the present invention can be achieved by the following method.

According to one aspect of the present invention, a method for detecting the position of an abnormal site of a buried pipe, comprising the steps of:

(a) detecting, as a reference signal, a signal generated from near the abnormal site on a pipe buried beneath a ground level;

(b) detecting those vibration signals contained in the signal generated from near the abnormal site at a plurality of places on the ground level;

(c) calculating, based on the vibration signals obtained from the vibration signal detection step, a vibration amplitude in a predetermined direction defined by a straight line connecting together at least two of the plurality of places;

(d) calculating a vibration energy propagation velocity in the predetermined direction based on the vibration signal obtained by the vibration signal step;

(e) calculating a cross-correlation function of the predetermined-direction vibration amplitude based on the reference signal and predetermined-direction vibration amplitude and cross-correlation function of the predetermined-direction vibration energy propagation velocity based on the reference signal and predetermined-direction vibration energy propagation velocity;

(f) calculating the predetermined-direction vibration intensity based on the cross-correlation function of the predetermined-direction vibration amplitude and cross-correlation function of the predetermined-direction vibration energy propagation velocity; and (g) estimating the direction of the abnormal site on the pipe buried beneath the ground level on the basis of the vibration intensity.

According to another aspect of the present invention, an apparatus for detecting the position of an abnormal site, comprising:

(a) means for detecting, as a reference signal, a signal generated from near the abnormal site on a pipe buried beneath a ground level;

(b) means for detecting those vibration signals contained in the signal generated from near the abnormal site at a plurality of places on the ground level;

(c) means for calculating, based on the vibration signals obtained from the vibration signal detection means, a vibration amplitude in a predetermined direction defined by a straight line connecting together at least two of the plurality of places;

(d) means for calculating a vibration energy propagation velocity in the predetermined direction based on the vibration signal obtained by the vibration signal detecting means;

(e) means for calculating a cross-correlation function of the predetermined-direction vibration amplitude based on the reference signal and predetermined-direction vibration amplitude and cross-correlation function of the predetermined-direction vibration energy propagation velocity based on the reference signal and predetermined-direction vibration energy propagation velocity;

(f) means for calculating the predetermined-direction vibration intensity based on the cross-correlation function of the predetermined-direction vibration amplitude and cross-correlation function of the predetermined-direction vibration energy propagation velocity; and (g) means for outputting, as vector data, the vibration intensities so as to obtain vector data representing the direction of the abnormal site on the buried pipe.

According to another aspect of the present invention, an apparatus for detecting the position of an abnormal site on a buried pipe, comprising:

(a) means for detecting, as a reference signal, a signal generated from near the abnormal site on a pipe beneath a ground level;

(b) first, second and third vibration signal detecting means each arranged on a corresponding apex of a right-angled triangle defined on a ground level;

(c) means for calculating, based on first, second and third vibration signals obtained from the first, second and third vibration signal detecting means, a vibration amplitude of an X-axis direction connecting together first and second apexes of the right-angled triangle and a vibration amplitude of a Y-axis direction connecting together the first and third apexes of the right-angled triangle;

(d) means for calculating a propagation velocity of the X-axis direction vibration energy and propagation velocity of the Y-axis direction vibration energy on the basis of the first, second and third vibration signals;

(e) means for calculating a cross-correlation function of the X-axis direction vibration amplitude based on the reference signal and the X-axis direction vibration amplitude, cross-correlation function of the Y-axis direction vibration amplitude based on the reference signal and Y-axis direction vibration amplitude and a cross-correlation function of the X-axis direction vibration energy propagation velocity based on the reference signal and X-axis direction vibration energy propagation velocity and cross-correlation function of the Y-axis direction vibration energy propagation velocity based on the Y-axis direction vibration energy propagation velocity;

(f) means for calculating an X-axis direction vibration intensity based on a cross-correlation function of the X-axis direction vibration amplitude and cross-correlation function of the X-axis direction vibration energy propagation velocity and a Y-axis direction vibration intensity based on a cross-correlation function of the Y-axis direction vibration amplitude and cross-correlation function of the Y-axis direction vibration energy propagation velocity;

(g) means for vectorially composing the X-axis direction vibration intensity and Y-axis direction vibration intensity so as to obtain resultant vector data representing the position of the abnormal position; and (h) means for delivering the resultant vector data as an output.

According to another aspect of the present invention, an apparatus for detecting the position of an abnormal site on a buried pipe, comprising:

(a) means for detecting, as a reference signal, a signal generated from near the abnormal site on that pipe buried beneath a ground level;

(b) means for detecting those vibration signals contained in the signal generated from near the abnormal site at a plurality of places on the ground level;

(c) means for calculating those vibration amplitudes from the vibration signal detecting means;

(d) means for calculating, based on the vibration signal and vibration amplitude, each cross-correlation function of those vibration amplitudes at least two of the plurality of places;

(e) means for calculating, as a maximum level difference of the respective correlation functions, a vibration propagation time difference of a predetermined direction defined by a straight line connecting together the at least two places; and (f) means for delivering the predetermined-direction propagation time difference, as an output so as to obtain vector data representing the direction of the abnormal site on the buried pipe.

According to another aspect of the present invention, an apparatus for detecting the position of an abnormal site on a pipe buried beneath a ground level, comprising:

(a) a plurality of means arranged at predetermined intervals on the pipe;

(b) means for calculating, based on a plurality of vibration signals obtained from the plurality of vibration signal detecting means, those vibration amplitudes in a plurality of directions defined by a plurality of straight lines connecting together the respective direction vibration signal detecting means;

(c) means for calculating cross-correlation functions of the respective vibration amplitudes based on those predetermined-direction vibration amplitudes;

(d) means for calculating the respective direction vibration propagation time difference based on the respective direction cross-correlation functions; and (e) means for outputting, as vector data, the respective direction propagation time difference so as to obtain vector data representing the direction of an abnormal site on the buried pipe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing a detail of the detecting apparatus shown in FIG. 1;

FIG. 4 is a view showing the composition of vectors in the detecting apparatus of FIG. 1;

FIGS. 7 and 8 are graphs showing propagation time difference data in the second embodiment of the present invention;

DETAILED DESCRIPTION PREFERRED EMBODIMENTS

Figure 6:
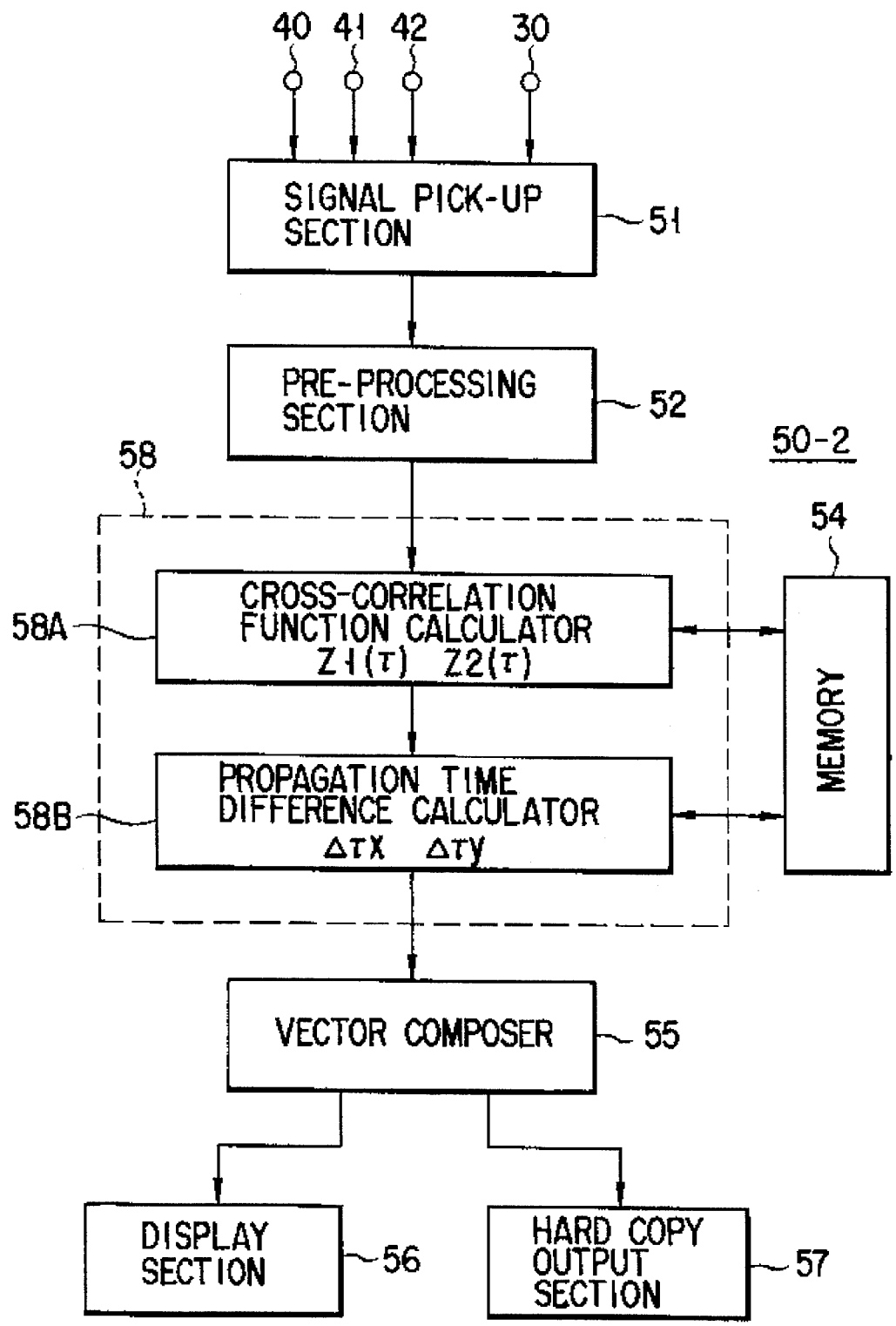
FIG. 6 is a flow diagram showing a detail of a flow-of-fluid site detecting apparatus according to a second embodiment of the present invention.

The present invention will be explained below as being applied to a method and apparatus for detecting, for example, a leak-of-water site at a water service pipe or main. An arrangement as shown in FIGS. 1 and 2 is applied to a first embodiment as shown in FIGS. 1 and 2 and to a second embodiment as shown in FIGS. 6 to 8.

Figure 1:
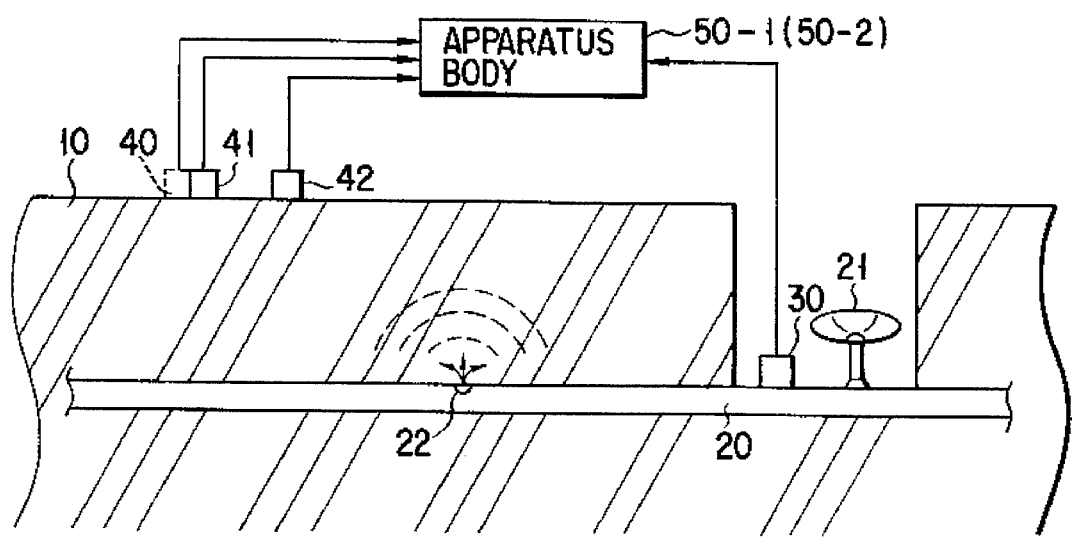
FIG. 1 is a view, partly broken away, showing a leak-of-fluid site detecting apparatus according to a first embodiment of the present invention.
Figure 2:
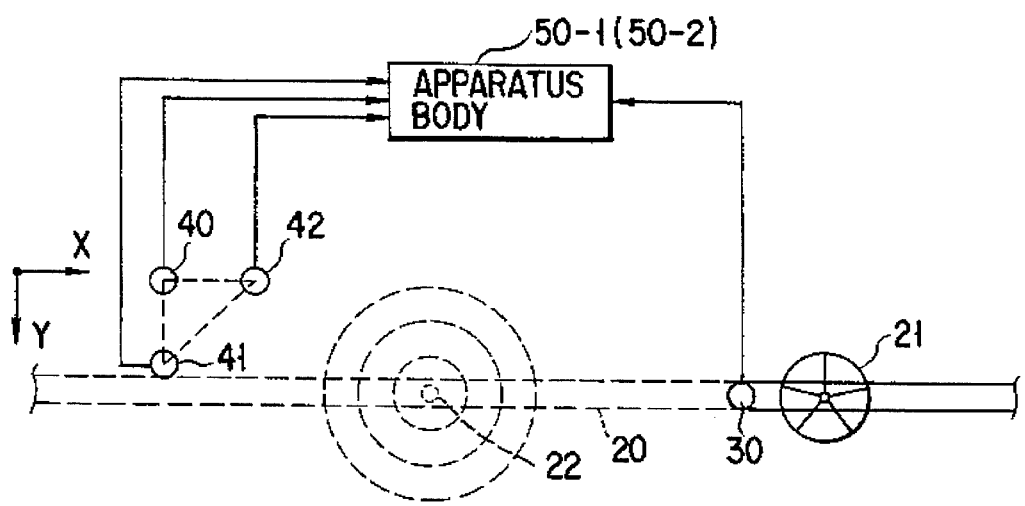
FIG. 2 is a plan view showing the detecting apparatus of FIG. 1.

As shown in FIGS. 1 and 2, a valve 21 is mounted at a predetermined place on a water service pipe 20 buried under a ground surface 10 and is exposed on the ground surface 10. A leak-of-water site 22 is present in the water pipe 20.

A leak-of-water signal detector 30 is provided on the exposed surface of the pipe 20 at the ground surface in the neighborhood of the valve 21 to detect a vibration (leak-of-water signal) caused by a leak of water. As the signal detector 30, use can be made of an acceleration sensor for detecting an acceleration signal propagated from, for example, the surface of the water pipe 20 and a pressure sensor for detecting a variation in pressure of water in the water pipe 2. In this case, it is to be noted that the leak-of-water signal detector 30 is located directly on the water pipe 20 or at a place very near the water pipe 20 and it is, therefore, possible to readily pick up only a signal closely associated with a leak-of-water signal.

Three vibration signal detectors 40, 41 and 42 are arranged on the ground surface 10 to detect a vibration (vibration signal) picked up on the ground surface 10. The vibration signal detectors 40, 41 and 42 use can be made of an acceleration sensor. Those vibration signals picked up by the vibration signal detectors 40, 41 and 42 contain those vibrations produced by water leaking from the pipe 20. The detectors 40, 41 and 42 are located at apexes of a right-angled triangle on substantially the same flat plane as that of the ground surface 1 as shown in FIG. 2, for example, in a coordinate system with an X-axis set in a direction of a straight line connecting together the directors 40 and 42 and a Y axis set in a straight line connecting together the detectors 40 and 41, that is, with the X-axis set in the direction connecting together the first and second apexes of the right-angled triangle and the Y axis set in the direction connecting together the first and third apexes.

The leak-of-water signal and vibration signals picked up by the leak-of-water detector and vibration signal detectors 40, 41 and 42 are input to an apparatus body 50-1 in the first embodiment 50-1.

The apparatus body 50-1 can calculate the vibration amplitudes and speeds, cross-correlation functions, vibration intensities and resultant vector data and can generate a data output. That is, the apparatus body 50-1 calculates the vibration amplitudes and speeds among the outputs of the vibration signal detectors 40, 41 and 42 using the outputs of the detectors 40, 41 and 42, the cross-correlation functions of the vibration amplitudes and speeds using the outputs of the vibration amplitudes and speed and output of the detector 30, and the vibration intensity for each cross-correlation function, finds resultant vector data representing the position of the leak-of-water site 22 with the use of the vibration intensity, displays the resultant vector data as image data and outputs a hard copy.

The method for the detection of the leak-of-water site by the detection apparatus will be explained below, noting that this method is carried out through signal processing mainly in the apparatus body 50-1.

Before the explanation of the present method, explanation will be given below of the case where the vibration intensity is calculated by the vibration amplitude and speed only, not by using the cross-correlation function. In the case where water leaks in the site 22 on the pipe, a leak-of-water signal is detected by the detector 30 and input to the apparatus body 50-1. Similarly, the three vibration signal detectors 40, 41 and 42 detect corresponding vibration signals from the water pipe 20 and the vibration signals are input to the apparatus body 50-1 where an X-axis direction (X-channel) signal component and Y-axis direction (Y-channel) signal component are subjected to separate signal processing.

For the X-channel signal processing, the approximation data of a propagation velocity $I{-}_{,x}^{(t)}$ of the X-axis vibration energy is calculated by the space difference calculation of the vibration amplitude, as will be set out below, which is space-differentiated along the X-axis direction.

$$I{-}_{,x}^{(t)} = y_3^{(t)} - y_2^{(t)} \quad (1)$$

where $y_2^{(t)}$: the vibration amplitude of the signal detected by the signal detector 40; and $y_3^{(t)}$: the vibration amplitude of the signal detected by the signal detector 42.

The X-axis direction vibration energy $^-W_x$ is found by multiplying the propagation velocity $I{-}_{,x}^{(t)}$ of the x-channel vibration energy indicated by an equation (1) by a signal obtained by the time differentiation of the vibration amplitude of the signal detected by the signal detector 5, and then integrating the resultant product by the time t. In this case, the aforementioned vibration energy contains, not only those leak-of-water sound originating from the water pipe 20, but also those vibration components such as those originating from a running car or cars and from a distribution transformer placed on the ground or on a pole on the ground. In the calculation processing for calculating the aforementioned vibration intensity based on the vibration amplitude and speed only, not using any cross-correlation function, therefore, it is not possible to accurately detect the leak-of-water site. The method and apparatus of the present invention as will be set out below are advantageous over those set out immediately above.

Now explain the method and apparatus of the present invention according to which the vibration intensity is calculated using the cross-correlation function of the vibration amplitude and speed. That is, according to the present invention, it is necessary to pick up a leak-of-water signal propagated on the water pipe 20 and to examine the direction in which that signal is propagated. According to the present invention, with those time sequential signals subjected to statistical processing, cross-correlation processing is carried out between a leak-of-water signal $y_1^{(t)}$ originating from the water pipe 20 as detected by the leak-of-water signal detector 4 and the vibration amplitude $Y_2$ of a signal detected by the vibration signal detector 40. By so doing, a cross-correlation function $Z+,x,y(\tau)$ is found.

$$Z_{+,x,y}^{(\tau)} = \int dt\, y_1^{(t)} y_2^{(t+\tau)} \quad (2)$$

As indicated by an equation (3) below, cross-correlation processing is performed between the leak-of-water signal $y_1^{(t)}$ coming from the water pipe 20 as detected by the leak-of-water detector 30 and the propagation velocity $I_{-,x}^{(t)}$ of the vibration energy to the X-channel. A cross-correlation function $Z_{-,x,y}^{(t)}$ is found by so doing.

$$Z_{-,x,y}^{(\tau)} = \int dt\, y_1^{(t)} I_{-,x}(t-\tau) \quad (3)$$

Those cross-correlation functions obtained by the equations (2) and (3) are closely related to the leak-of-water signal coming from the surface of the water pipe 20 and the signal can be differentiated from a noise signal originating from running cars on the ground surface 10, etc. From the cross-correlation functions thus obtained from the equations (2) and (3) it is possible to detect the X-channel vibration intensity $W_x$ on the ground level 10 as indicated by the equation (4) above.

$$W_x = \int d\tau\, (d/d\tau \cdot Z_{-,x,y}^{(\tau)}) Z_{-,x,y}^{(\tau)} \quad (4)$$

For the Y-channel case, on the other hand, the Y-channel vibration intensity $W_y$ can be detected on the ground surface 10 as given below:

$$W_y = \int d\tau (d/d\tau \cdot Z_{+,y,y}^{(\tau)}) \cdot Z_{-,y,y}^{(\tau)} \quad (5)$$

where $Z_{+,y,y}^{(t)}$ is represented by the cross-correlation function of the leak-of-water signal $y_1^{(t)}$ corresponding to the vibration energy propagating along the Y-axis direction and the vibration amplitude $y_2^{(t)}$.

$$Z_{+,y,y}^{(\tau)} = \int dt\, y_1(t) y_2^{(t+\tau)} \quad (6)$$

where $Z_{+,y,y}^{(\tau)}$ is represented by a cross-correlation function of the leak-of-water signal $y_1^{(t)}$ and the propagation velocity $I_{-,y}^{(t)}$ of the vibration energy in the Y channel.

$$Z_{-,y,y}^{(\tau)} = \int dt\, g_1^{(t)} I_{-,y}^{(t+\tau)} \quad (7)$$

The propagation velocity $I_{-,y}^{(t)}$ of the Z-axis vibration energy can be approximated by the space difference calculation of the vibration amplitude, as indicated by an equation (8) below, which is space-differentiated along the Y-axis.

$$I_{-,y}^{(t)} = y_4^{(t)} - y_2^{(t)} \quad (8)$$

where $y_2^{(t)}$: the vibration amplitude of a signal detected by the signal detector 40; and $y_4^{(t)}$: the vibration amplitude of the signal detected by the vibration signal detector 41.

In this way, the X- and Y-axis direction vibration intensities $W_x$ and $W_y$ are found by the present method and apparatus and, therefore, as shown in FIG. 4, it is possible, through a vectorial composition, to determine, by a resultant vector W in FIG. 4, in which direction the leak-of-water signal originating from a leaf-of-water site on the water pipe 20 comes. Through such measurement at many places over the ground surface, it is possible to locate the leak-of-water site 22 on the pipe 20 buried beneath the ground surface.

The apparatus of the present embodiment will be explained below in more detail.

As shown in FIG. 3, the present apparatus comprises a leak-of-water signal detector 30 and vibration detectors 40, 41 and 42 and an apparatus body 50-1. The apparatus body 50-1 comprises a signal pick-up section 51, a pre-processing section 52, a digital processing section 53, a memory 54, a vector composer 55, a display unit 56 and a hard copy output section 57. The digital processing section 53 comprises a speed calculator 53A, an amplitude calculator 53B, a cross-correlation function calculator 53C and a vibration intensity calculator 53D.

with the first, second and third vibration signal detectors 40, 41 and 42 arranged on the respective apexes of a right-angled triangle plane defined on the ground surface 10 and the leak-of-water detector 30 placed directly on the water pipe 20, the outputs of these signals 40, 41 and 42 and 30 are collected by a signal pick-up section 51 to the apparatus body 50-1. These outputs are amplified and A/D converted in the pre-processing section 52 and sent to the digital processing section 53.

The speed calculator 53A in the digital processing section 53 calculates, based on first to third vibration signals of the first to third vibration detectors 40, 41 and 42, an X-axis direction vibration amplitude connecting together the first and second apexes of the right-angled triangle and a Y-axis direction vibration amplitude connecting together the first and third apexes of the right-angled triangle.

The speed detector 53B in the digital processing section 53 calculates the X- and Y-axis direction speeds based on the first, second and third vibration signals from the first, second and third vibration detectors 40, 41 and 42.

The cross-correlation function calculators 52C in the digital processing section 53 calculates a cross-correlation function of the X-axis direction vibration amplitude based on the leak-of-water signal and X-axis direction vibration amplitude and a cross-correlation function of the Y-axis direction vibration amplitude based on the leak-of-water signal and Y-axis direction vibration amplitude.

The vibration intensity calculator 53D in the digital processing section 53 calculates the X-axis direction vibration intensity based on a cross-correlation function of the X-axis direction vibration amplitude and X-axis direction speed and the Y-axis direction vibration intensity based on a cross-correlation function of the Y-axis direction vibration amplitude and Y-axis direction speed.

The speed calculator 53A, amplitude calculator 53B, cross-correlation function calculator 53C and vibration intensity calculator 53D in the digital processing section 53 reserve data in the memory 54, as required, and gain access to the reserved data so as to perform predetermined processing.

In order to obtain resultant vector data representing the position of the leak-of-water site 22 on the pipe, the vector composer 55 vectorially composes the X-and Y-axis direction vibration intensities. The display unit 56 and hard copy output section 57 displays a resultant vector data as image data and outputs it as a hard (paper) copy.

Figure 5:
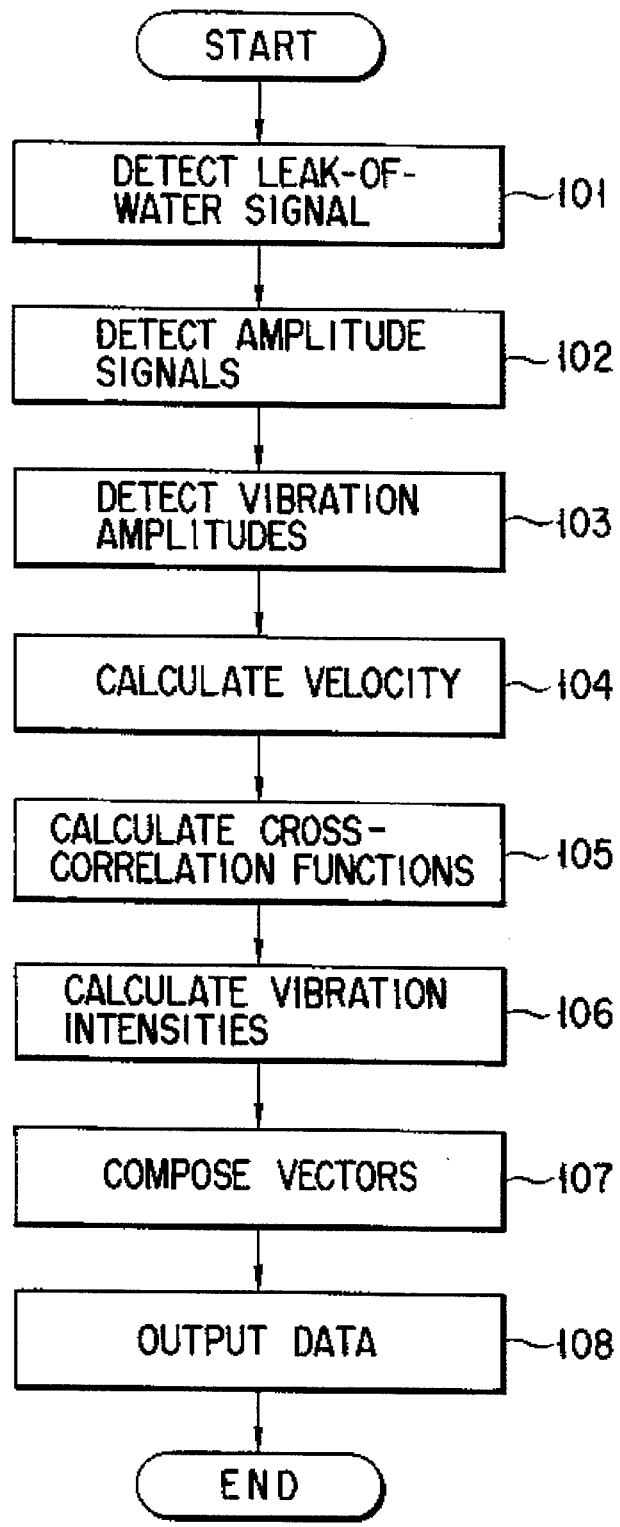
FIG. 5 is a flow diagram showing one example of a leak-of-fluid site detecting apparatus according to the present invention.

The present detection method can be achieved by those steps 101 to 108 as shown in FIG. 5.

That is, step 101 detects, with the use of the leak-of-water signal detector, a leak-of-water signal generated upon the leak, into the ground, of a running fluid through the water pipe buried beneath the ground level. Step 102 detects first, second and third vibration signals detected by the first, second and third detectors 40, 41 and 42 arranged at the respective apexes of the right-angled triangle plane defined on the ground surface.

Step 103 calculates, based on the first, second and third vibration signals obtained by the vibration signal detection step 102, the X-axis direction vibration amplitude connecting together the first and second apexes of the right-angled triangle and Y-axis direction vibration amplitude connecting together the first and third apexes of the right-angled triangle defined.

Step 104 calculates the X- and Y-axis direction speeds based on the first, second and third vibration signals obtained from step 102.

Step 105 calculates a cross-correlation function of the X-axis direction vibration amplitude based on the leak-of-water signal and X-axis direction vibration amplitude and a cross-correlation function of the Y-axis direction vibration amplitude based on the leak-of-water signal and Y-axis direction vibration amplitude.

Step 106 calculates the Y-axis direction vibration intensity based on the X-axis direction speed and a cross-correlation function of the X-axis direction vibration amplitude and the Y-axis direction vibration intensity based on the Y-axis direction speed and a cross-correlation function of the Y-axis direction vibration amplitude.

Step 107 vectorially composes the X- and Y-axis direction vibration intensities to obtain resultant vector data representing the direction of the leak-of-water site. Step 108 outputs that resultant vector data.

Although the amplitude signal detectors 40, 41 and 42 for detecting vibrations on the ground surface 10 have been explained as being located with the detectors 41 and 42 arranged in an intersecting relation with the detector 40 as a reference, they are not restricted thereto. Through calculation processing by the apparatus body, a leak-of-water site 22 on the water pipe 20 laid beneath the ground surface can be located if these detectors are properly arranged.

Although, in the aforementioned embodiment, the leak-of-water site 22 on the water pipe 20 is located using three vibration signal detectors 40, 41 and 42 each arranged at a corresponding apex of the right-angled triangle configuration, if the position of the water pipe 20 buried beneath the ground level is initially known, it is possible to, even in the case where two signal detectors are arranged along the water pipe 20 beneath the ground level 10, calculate vibration intensities in the running direction of the water pipe 20 by the same signal processing as set out above, output the corresponding vibration intensities as vector data and locate the leak-of-water site 22 on the water pipe 20. That is, by calculating those vibration intensities at a plurality of places along the water pipe 20, it is possible to estimate the leak-of-water site 22 where the vector data directions are substantially 180° shifted.

It is not a necessary requirement that the leak-of-water signal detectors be arranged directly on the water pipe 20. If use is made of those sensors which can detect a signal relation to leak-of-water signals with a high accuracy, in place of being arranged directly on the water pipe 20, these sensors can be arranged, as detecting means, on the ground surface.

In the present embodiment, it is possible to use a D.S.P (digital signal processor) and auxiliary memory as the apparatus body 50-1. By so doing, high-speed calculation processing can be performed through the signal processing as set out above in connection with the previous embodiment, thus enabling the leak-of-water site to be detected rapidly.

A second embodiment of the present invention will be explained below with reference to FIG. 6. The first and second embodiments are based on the intensity method using the correlation processing. The correlation processing of the first embodiment is for noise elimination while, on the other hand, the correlation processing of the second embodiment is for performing a noise elimination for finding a propagation time difference.

The second embodiment includes a leak-of-water signal detector 30 and vibration signal detectors 40, 41 and 42 as in the preceding embodiment shown in FIGS. 1 and 2. The respective outputs of these detectors 30 and 40, 41 and 42 are input to an apparatus body 50-2 of the second embodiment.

The apparatus body 50-2 calculates cross-correlation function $Z1(\tau)$, $Z2(\tau)$ and $Z3(\tau)$ using the outputs of the vibration signal detectors 40, 41 and 42 and output of the leak-of-water signal detector 30, calculates, based on the cross-correlation functions $Zi(\tau)$, $Z2(\tau)$ and $Z3(\tau)$, signal propagation time differences $\Delta\tau x$ and $\Delta\tau y$ for respective channels, finds resultant vector data representing the direction of the position of the leak-of-water site 22 by the signal propagation time differences $\Delta\tau x$ and $\Delta\tau y$ and displays the resultant vector data as image data and outputs a hard copy. The apparatus body 50-2 will be explained below in more detail. That is, the apparatus body 50-2 comprises a signal pick-up section 51, a pre-processing section 52, a digital processing section 58, a memory 54, a vector composer 55, a display unit 56 and a hard copy output section 57. The second embodiment is different from the first embodiment in terms of the arrangement of the digital processing section 58 only. The digital processing section 58 only. The digital processing section 58 comprises a cross-correlation function calculator 58A and signal propagation time difference calculator 58B.

With the first, second and third vibration signal detectors 40, 41 and 42 arranged on the respective apexes of a right-angled triangle defined on the ground surface 10 and the detector 30 arranged directly on the water pipe 20, these outputs of the detectors 40, 41 and 42 and 30 are picked up by the signal pick-up section 51 and collected at the apparatus body 50-2. These outputs thus picked up are sent to the pre-processing section 52 where they are amplified and A/D converted. The A/D converted signal is sent to the digital processing section 58.

The cross-correlation function calculator 58A in the digital processing section 58 calculates a cross-correlation function based on those vibration amplitudes $y2^{(t)}$, $y_3^{(t)}$ and $y_4^{(t)}$ and that leak-of-water signal $y_1^{(t)}$ which is obtained from the leak-of-water signal detector 30, these vibration amplitudes being based on first, second and third vibration signals obtained from the first, second and third vibration signal detectors 40, 41 and 42. That is, the cross-correlation function calculator 58A performs the cross-correlation processing between the leak-of-water signal $y_1^{(t)}$ and the vibration amplitude $y_1^{(t)}$ obtained from the vibration signal detector 40 to find a cross-correlation function $Z_1^{(\tau)}$ as given below.

$$Z_1^{(\tau)} = \int y_1^{(t)} \cdot y_2^{(t+\tau)} dt$$

Similarly, cross-correlation processing is also carried out between the leak-of-water signal $y_1^{(t)}$ and he vibration amplitude signals $y_3^{(t)}$ and $y_4^{(t)}$ obtained from the vibration signal detector 41.

$$Z_2^{(\tau)} = \int y_1^{(t)} \cdot y_3^{(t+\tau)} dt$$

$$Z_3^{(\tau)} = \int y_1^{(t)} \cdot y_4^{(t+\tau)} dt$$

Then the signal propagation time difference calculator 58B in the digital processing section 58 finds, as shown in FIGS. 7 and 8, a time $\tau_1$ max when the cross-correlation function $Z_1^{(\tau)}$ is maximal. Similarly, the calculator 58B finds times $\tau_2$ max and $\tau_3$ max when $Z_2^{(\tau)}$ and $Z_3^{(\tau)}$ are maximal.

Since the time max denotes a time at which the leak-of-water signal is propagated to the detector on the ground surface, if $\Delta\tau x$ represents a time at which the leak-of-water signal is propagated between the X channel vibration signal detectors 40 and 42 and $\Delta\tau y$ represents a time at which the leak-of-water signal is propagated between the Y channel vibration signal detectors 40 and 41, then the following equations are obtained with $\tau_1$ max as a reference, noting that $\Delta\tau x$ represents a propagation time difference.

$$\Delta\tau x = \tau_2 max - \tau_1 max$$

$$\Delta\tau y = \tau_3 max - \tau_1 max$$

In order to obtain resultant vector data representing the position of the leak-of-water site 22, the vector composer 55 vectorially composes the X-axis direction propagation time difference $\Delta\tau x$ and Y-axis direction propagation time difference $\Delta\tau y$ in the same case as shown in FIG. 4.

The display section 56 displays the resultant vector data as image data and the hard copy output section 57 outputs a hard (paper) copy.

The cross-correlation function calculator 58A and signal propagation time difference calculator 58B in the digital processing section 58 reserve data in memory 54, if required, and gain access to the reserved data to perform predetermined processing.

Figure 9:
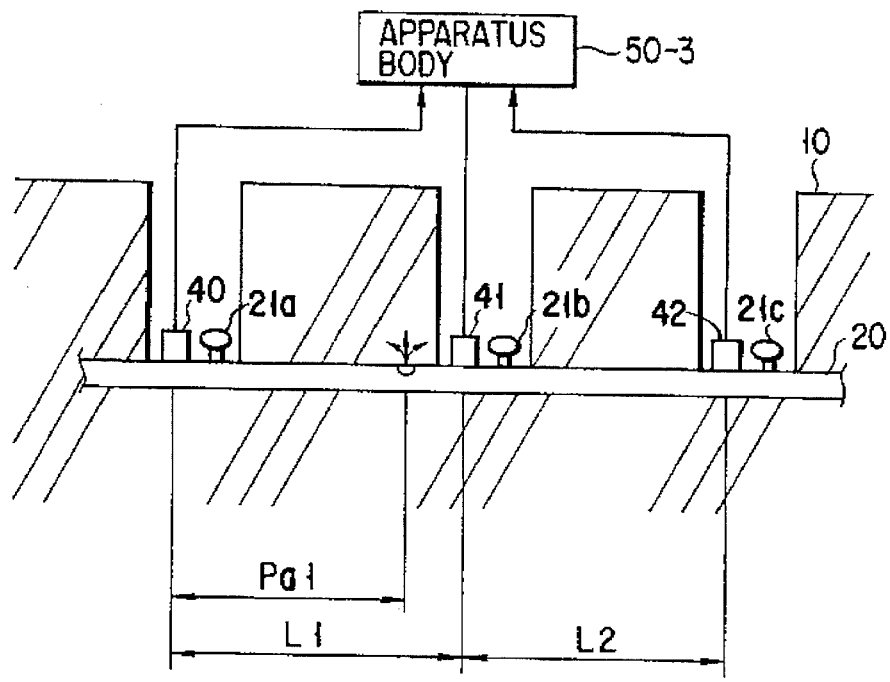
FIG. 9 is a view, partly broken away, showing a leak-of-fluid site detecting apparatus according to a third embodiment of the present invention.
Figure 10:
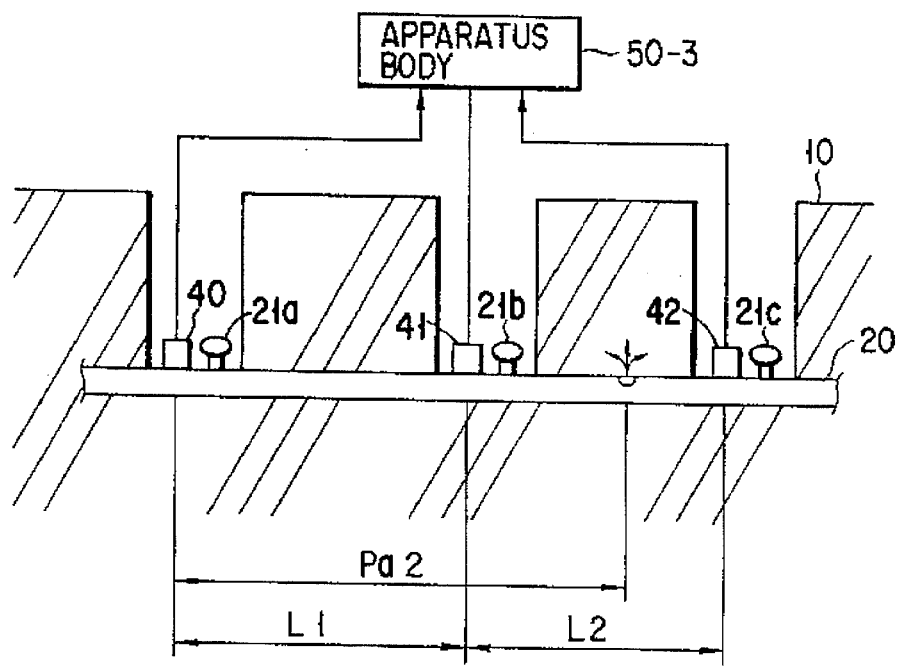
FIG. 10 is a block diagram showing a detail of the detecting apparatus shown in FIG. 9.
Figure 11:
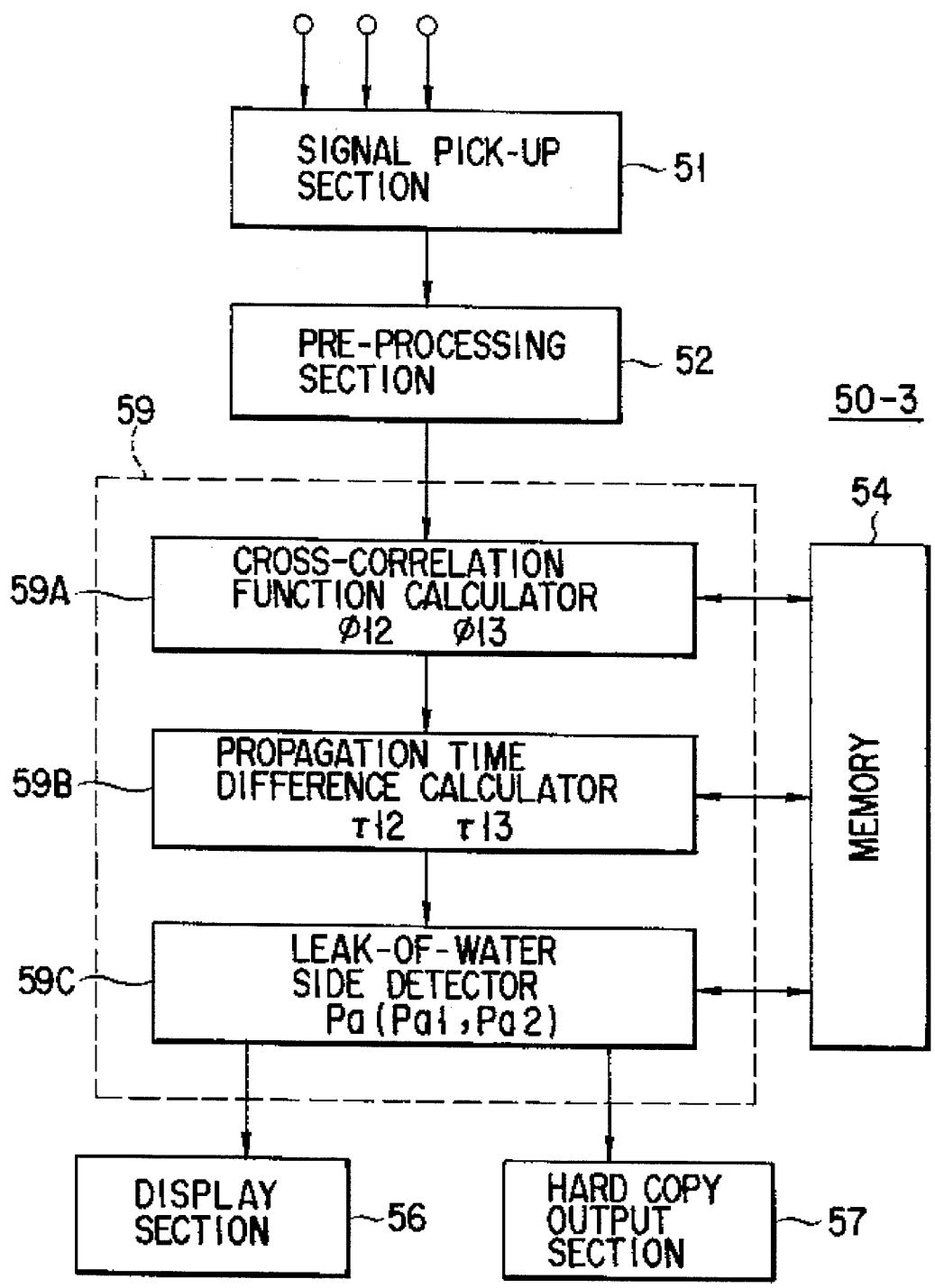
FIG. 11 is a variant of the detecting apparatus shown in FIG. 9.

A third embodiment of the present invention will be explained below with reference to FIGS. 9 to 11. The third embodiment locates a vibration source by the correlation method. In this embodiment, vibration signal detectors 40, 41 and 42 are arranged near valves 21a, 21b and 21c on a water pipe. The respective outputs of the vibration signal detectors 40, 41 and 42 are input to an apparatus body 50-3 in the third embodiment. 10 As shown in FIGS. 9 and 10, $L_1$ shows a distance between the vibration signal detector 40 and the vibration signal detector 41, and $L_2$, a distance between the vibration signal detector 41 and the vibration signal detector 42. In the case shown in FIG. 9, a leak-of-water site 22 is sandwiched between the vibration signal detectors 40, 41 and 42. In the arrangement shown in FIG. 9, the leak-of-water site 22 is situated between the vibration signal detectors 40 and 41 and, in the arrangement shown in FIG. 10, the leak-of-water site 22 is situated between the vibration signal detectors 41 and 42. In the arrangement shown in FIG. 9, the leak-of-water site 22 can be located by calculating a distance Pa1 from the vibration signal detector 40, while, in the arrangement shown in FIG. 10, the leak-of-water site 22 is located by calculating a distance Pa2 from the vibration signal detector 40.

The leak-of-water site detection apparatus of the third embodiment includes those vibration signal detectors 40, 41 and 42 and apparatus body 50-3. The apparatus body 50-3 comprises a signal pick-up section 51, a pre-processing section 52, a digital processing section 59, a memory 54, a display section 56 and a hard copy output section 57. The digital processing unit 59 comprises a cross-correlation function calculator 59A, a propagation time difference calculator 59B and a leak-of-water site detector 59C. Those vibration amplitudes $y_1^{(t)}$, $y_3^{(t)}$ and $y_4^{(t)}$ from the first, second and third vibration signal detectors 40, 41 and 42 are picked up by the signal pick-up section 51 and sent as output data items from there to the apparatus body 50-3. These data items are amplified and A/D converted at the preprocessing section 52 and then sent to the digital processing section 59.

The cross-correlation function calculator 59A in the digital processing section 59 calculates, based on those vibration amplitudes $y_1^{(t)}$, $y_3^{(t)}$ and $y_4^{(t)}$, the cross-correlation functions of the respective channel vibration amplitudes. Here, the channels are intended to mean a pick-up system (first channel) for a path between the first and second vibration signal detectors 40 and 41 and a pick-up system (second channel) for a path between the first and third vibration signal detectors 40 and 42.

The propagation time difference calculator 59B in the digital processing section 59 calculates a vibration propagation time difference based on the cross-correlation function. The calculator 59C calculates, based on the vibration propagation time difference, position data Pa1 (Pa2) representing the position or site where water leaks. The display section 56 displays the position data as image data and the hard copy output section 57 outputs it as a hard (paper) copy.

The operation of the digital processing section 59 will be explained below in more detail.

That is, the vibration signals measured at the first, second and third vibration signal detectors 40, 41 and 42 are delayed by those propagation times $a/C$, $(L_1-a)/C$ and $(L_2+L_2-a)/C$, respectively, as compared with the vibration occurring at the leak-of-water site 22, noting that, here, C represents the propagation velocity and is given as a constant along the water pipe path.

With a change in time of vibration of the vibration source represented by $S(t)$ and disregarding the attenuation of the vibration on the propagation path, the vibration amplitudes $y_2^{(t)}$, $y_3^{(t)}$ and $y_4^{(t)}$ are given below:

$$y_2^{(t)} = S(t-a/C) \qquad (9)$$

$$y_3^{(t)} = S(t-(L_1-a)/C) \qquad (10)$$

$$y_4^{(t)} = S(t-(L_1+L_2-a)/C) \qquad (11)$$

Hence, the cross-correlation function $\phi_{12}^{(t)}$ becomes.

$$\begin{aligned}\phi_{12}(t) &= (1/T)\int_0^T y_1(t)\,y_2(t+\tau)dt \\ &= (1/T)\int_0^T S(t-(L_1-a)/C) \\ & \quad S(t-(L_1-a)/C+\tau)dt \\ &= (1/T)\int_0^T S(t)S(t+(2a-L_1)/C+\tau)dt \\ &= \phi_{SS}(\tau-(2a-L_1)/C)\end{aligned} \qquad (12)$$

Here, $\phi_{SS}(\tau)$ represents an autocorrelation function.

Therefore, the time $\tau=\tau_{12}$ corresponding to the maximum value of $\phi_{12}(\tau)$ is as follows:

$$Max\phi_{12}(\tau)=\phi_{12}(\tau/2)=\phi_{SS}(O) \qquad (13)$$

$$\therefore \tau 12 = (2a-L_1)/C \qquad (14)$$

That is, the time corresponding to the maximal value of the cross-correlation function on the leak-of-water vibration as measured by the first and second vibration signal detectors 40 and 41 corresponds to the propagation time difference $\tau_{12}$ at the first channel. Similarly, the propagation time difference $\tau_{13}$ between the first and third vibration signal detectors 40 and 42 is as follows:

$$\tau_{13}=(2a-L_1-L_2)/C \qquad (15)$$

If the propagation velocity C is eliminated from the equations (14) and (15), then the leak-of-water position is given below:

$$a=L_2/2+L_2\cdot\tau_{12}/2(\tau_{12}-\tau_{13}) \qquad (16)$$

Even in the arrangement shown in FIG. 10, the leak-of-water position a is found through the measurement of $\tau_{12}$, $\tau_{13}$.

$$a=(L_1+L_2)/2+(L_1\cdot\tau_{13})/(2\tau_{12}) \qquad (17)$$

The propagation velocity C of those unknown values in the equations (14) and (15) can be found by substituting the values $\tau_{12}$ and $\tau_{13}$ into the equations (14) and (15).

If the propagation time difference is thus measured from the two cross-correlation functions, the leak-of-water position can be located since the distance between the associated vibration signal detectors is known.

Even in the case where the propagation velocity is unknown, the leak-of-water site can be located without initially measuring the propagation velocity of the leak-of-water signal. It is also possible to find the propagation velocity.

Figure 12:
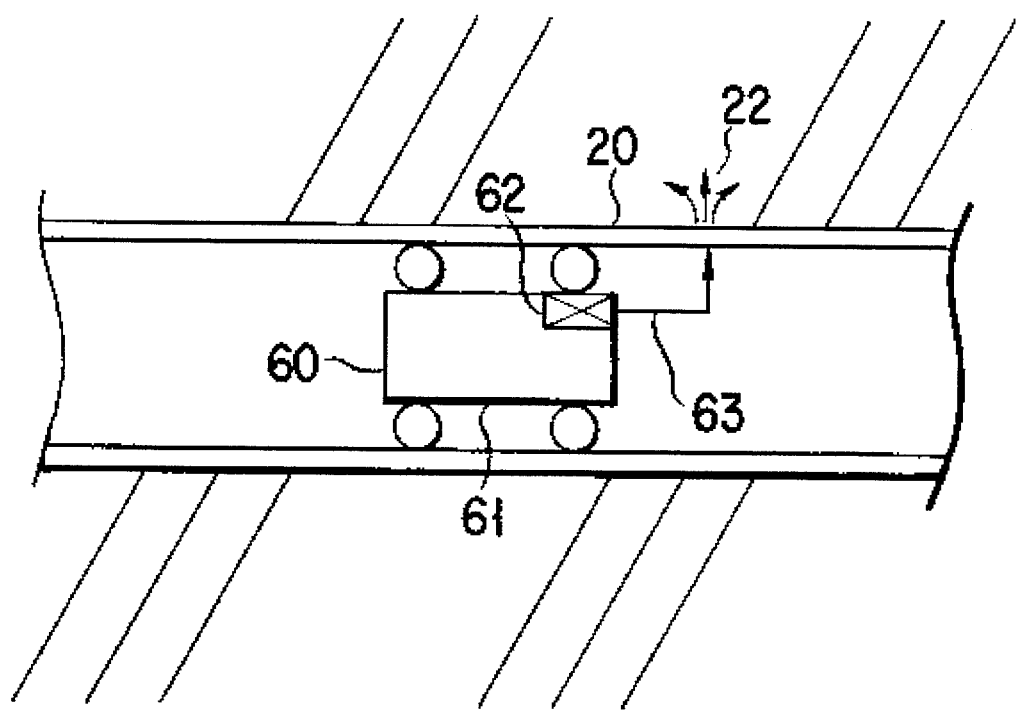
FIG. 12 is a view showing a device for forcibly generating vibrations.

In the first and second embodiments, the leak-of-water signal detector 30 is arranged on the water pipe 20 and detects the vibration signal or pressure variation signal, closely associated with the leak-of-water site, as a reference signal directly or indirectly from the water pipe 20. It is, therefore, difficult, or impossible, to detect the reference signal in the case where there is less leak of water or an abnormality involving no leak of water. In such cases, it is advantageous to utilize the apparatus shown in FIG. 12. As shown in FIG. 12, a forced vibration generator 60 is arranged which is comprised mainly of a checking robot movable within and along the water pipe 20. The forced vibration generator 60 comprises that checking robot 61 desirably movable back and force within the water pipe 20, a hammer 63 cable of forcibly striking the water pipe 20, and a force generator 62 for energizing the hammer 63. The checking robot 61 carries an ultrasonic sensor, an infrared sensor and a detector, such as a small CCD camera so as to detect any abnormality in the water pipe 20. In the case where any leak-of-water site 22, such as a very small crack, is detected in the water pipe 20 by the checking robot 61, the pipe is struck by the hammer 63 within the water pipe at an area near the abnormal site. It is, thus, possible to generate a signal, such as a random signal, from the struck water pipe 20. Such a signal is suited for cross-correlation processing and can be used as the aforementioned signal. It may be possible to detect, by the leak-of-water detector 30, such random signal as a reference signal through the water pipe 20. The apparatus body 50-1 (50-2) may be of such a type that a drive signal generated by the hammer 63 can be directly picked up, as a reference signal, with the force generator 62. With such a drive signal as a reference signal, it is possible to exceedingly heighten the S/N ratio of the reference signal. Thus the leak-of-water site can be precisely detected even in the case where it is difficult, or impossible, to detect the reference signal. In this case, it is not necessary to provide the water-of-leak signal detector 30.

By generating a random signal suited to cross-correlation processing by the forced vibration generator 60, the vibration signal detectors 40, 41, and 42 can also detect vibrations containing the random signal suitable for cross-correlation processing. It is, therefore, possible to obtain a high S/N signal from each of detectors 30, 40, 41 and 42 and to detect the position of an abnormal site highly accurately. Of course, a signal generated from the forced vibration generator 60 is not restricted only to the random signal.

The present invention can be applied not only to the detection of an abnormal site, such as a leak-of-water site on the water pipe, but also the other defects. That is, according to the present invention, it is also possible to detect any defects at a leak site on the gas pipe and oil pipe as a fluid running pipe. Further, the use of the forced vibration generator 60 enables the detection of an abnormal site not accompanied by the leak of the fluid. That is, the present invention can be applied even to the detection of those defects on the pipe which are not accompanied by a flow of a fluid.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for detecting a position of a leak occurring on a buried pipe containing a fluid and indicating said position on at least one of a display unit and a hard copy output unit, said apparatus comprising:

reference signal detecting means for detecting, as a reference signal, an acoustic signal generated from a physical defect on said buried pipe;

vibration signal detecting means for detecting vibration signals contained in said acoustic signal generated from said physical defect at a plurality of locations on a ground level;

vibration amplitude determining means for determining, based on said vibration signals obtained from said vibration signal detecting means, a vibration amplitude in a predetermined direction defined by a straight line connecting together at least two of said plurality of locations;

vibration energy propagation velocity determining means for determining a vibration energy propagation velocity in said predetermined direction based on said vibration signals obtained by said vibration signal detecting means;

cross-correlation function determining means for determining a cross-correlation function of said vibration amplitude in said predetermined direction based on said reference signal and on said vibration amplitude in said predetermined direction, and for determining a cross-correlation function of said vibration energy propagation velocity in said predetermined direction based on said reference signal and on said vibration energy propagation velocity in said predetermined direction;

vibration intensity determining means for determining a vibration intensity in said predetermined direction based on said cross-correlation function of said vibration amplitude in said predetermined direction and on said cross-correlation function of said vibration energy propagation velocity in said predetermined direction; and outputting means for outputting, as vector data, said vibration intensity so as to obtain vector data representing a direction of said physical defect on said buried pipe.

2. The apparatus according to claim 1, wherein said vibration signal detecting means is arranged at two of said plurality of locations on said ground level, along a running direction of said buried pipe.

3. The apparatus according to claim 1, wherein:

said vibration signal detecting means detects said vibration signals at a corresponding apex of a predetermined polygon at each of said plurality of locations;

said vibration amplitude determining means determines vibration amplitudes in a plurality of directions defined by a plurality of straight lines connecting together associated apexes of said polygon;

said vibration energy propagation velocity determining means determines vibration energy propagation velocities in said plurality of directions;

said cross-correlation function determining means determines a cross-correlation function of vibration amplitudes in said plurality of directions and a cross-correlation function of vibration energy propagation velocities in said plurality of directions;

said vibration intensity determining means determines vibration intensities in said plurality of directions; and said outputting means further includes vectorially composing means for vectorially composing said vibration intensities in said plurality of directions and for delivering resultant vector data obtained from said vectorially composing means as an output.

4. The apparatus according to claim 1, wherein said reference signal detecting means is positioned on an exposed pipe portion relative to a ground surface.

5. The apparatus according to claim 1, wherein said reference signal detecting means is comprised of an acceleration sensor.

6. The apparatus according to claim 1, wherein said reference signal detecting means is comprised of a pressure sensor for detecting a pressure of said fluid.

7. The apparatus according to claim 1, further comprising pipe striking means for forcibly striking said buried pipe.

8. The apparatus according to claim 7, wherein said pipe striking means comprises traveling means which travels within said buried pipe and striking means mounted on said traveling means.

9. The apparatus according to claim 1, wherein said vibration signal detecting means comprises first, second, and third vibration signal detecting means placed on corresponding apexes of a given right-angled triangle configuration defined on a ground surface.

10. An apparatus for detecting a position of a leak occurring on a buried pipe containing a fluid and indicating said position on at least one of a display unit and a hard copy output unit, said apparatus comprising:

reference signal detecting means for detecting, as a reference signal, an acoustic signal generated from a physical defect on said buried pipe;

first, second, and third vibration signal detecting means each arranged on a corresponding apex of a right-angled triangle defined on a ground surface;

vibration amplitude determining means, for determining, based on first, second, and third vibration signals obtained from said first, second, and third vibration signal detecting means, respectively, a vibration amplitude in an X-axis direction connecting together first and second apexes of said right-angled triangle and a vibration amplitude in Y-axis direction connecting together first and third apexes of said right-angled triangle;

vibration energy propagation velocity determining means or determining a propagation velocity of vibration energy in said X-axis direction and a propagation velocity of vibration energy in said Y-axis direction on the basis of said first, second, and third vibration signals;

cross-correlation function determining means for determining a cross-correlation function of said vibration amplitude in said X-axis direction based on said reference signal and on said vibration amplitude in said X-axis direction, a cross-correlation function of said vibration amplitude in said Y-axis direction based on said reference signal and on said vibration amplitude in said Y-axis direction, a cross-correlation function of said vibration energy propagation velocity in said X-axis direction based on said reference signal and on said vibration energy propagation velocity in said X-axis direction, and a cross-correlation function of said vibration energy propagation velocity in said Y-axis direction based on said vibration energy propagation velocity in said Y-axis direction;

vibration intensity determining means for determining a vibration intensity in said X-axis direction based on a cross-correlation function of said vibration amplitude in said X-axis direction and on a cross correlation function of said vibration energy propagation velocity in said X-axis direction, and for determining a vibration intensity in said Y-axis direction based on a cross-correlation function of said vibration amplitude in said Y-axis direction and on a cross-correlation function of said vibration energy propagation velocity in said Y-axis direction;

vectorially composing means for vectorially composing said vibration intensity in said X-axis direction and said vibration intensity in said Y-axis direction so as to obtain resultant vector data representing a position of said physical defect; and output means for delivering said resultant vector data as an output.

11. An apparatus for detecting a position of a leak occurring on a buried pipe containing a fluid and indicating said position on at least one of a display unit and a hard copy output unit, said apparatus comprising:

reference signal detecting means for detecting, as a reference signal, an acoustic signal generated from a physical defect on said buried pipe;

vibration signal detecting means for detecting vibration signals contained in said acoustic signal generated from said physical defect at a plurality of locations on a ground level; vibration amplitude determining means for determining vibration amplitudes of said vibration signals output from said vibration signal detecting means;

cross-correlation function determining means for determining, based on said vibration signals and said vibration amplitudes, each cross-correlation function of said vibration amplitudes at at least two of said plurality of locations;

vibration energy propagation velocity determining means for determining a vibration energy propagation velocity based on said vibration signals obtained by said vibration signal detecting means;

vibration propagation time difference determining means for determining, as a maximum level difference of respective cross-correlation functions, a vibration propagation time difference in a predetermined direction defined by a straight line connecting together said at least two locations; and output means for delivering said vibration propagation time difference in said predetermined direction as an output so as to obtain vector data representing a direction of said physical defect on said buried pipe.

12. The apparatus according to claim 11, wherein said vibration signal detecting means is arranged at two of said plurality of locations on a ground level, along a running direction of said buried pipe.

13. The apparatus according to claim 11, wherein:

said vibration signal detecting means is so arranged as to detect vibration signals at corresponding positions of apexes of a predetermined polygon at said plurality of locations;

said vibration amplitude determining means determines vibration amplitudes in a plurality of directions defined by a plurality of straight lines connecting together associated apexes of said polygon;

said vibration energy propagation velocity determining means determines vibration energy propagation velocities in said plurality of directions;

said cross-correlation function determining means determines a cross-correlation function of said vibration amplitudes in said plurality of directions;

said vibration propagation time difference determining means determines vibration propagation time differences in said plurality of directions; and said output means further includes vectorially composing means for vectorially composing vibration intensities in said plurality of directions and wherein said output means delivers resultant vector data obtained from said vectorially composing means.

14. The apparatus according to claim 11, wherein said vibration propagation time difference determining means comprises:

maximal cross-correlation means for determining a time when said cross-correlation functions of said vibration amplitudes in said plurality of directions become maximal; and means for determining signal propagation time differences in said plurality of directions based on a time when said cross-correlation functions thus determined by said maximal cross-correlation means become maximal.

15. The apparatus according to claim 11, wherein said reference signal detecting means is exposed on a fluid pipe portion relative to a ground surface.

16. The apparatus according to claim 11, wherein said reference signal detecting means comprises an acceleration sensor.

17. The apparatus according to claim 11, wherein said reference signal detecting means comprises a pressure sensor for detecting a pressure of said fluid.

18. The apparatus according to claim 11, further comprising pipe striking means for forcibly striking said buried pipe.

19. The apparatus according to claim 18, wherein said pipe striking means comprises traveling means which travels within said buried pipe and striking means mounted on said traveling means.

20. The apparatus according to claim 11, wherein said vibration signal detecting means comprises first, second, and third vibration signal detecting means placed at corresponding apexes of a given right-angled triangle.

21. An apparatus for detecting a position of a leak occurring on a buried pipe containing a fluid, and indicating said position on at least one of a display unit and a hard copy output unit, said apparatus comprising:

a plurality of vibration signal detecting means arranged at predetermined intervals on said buried pipe for detecting vibration signals associated with a physical defect on said buried pipe;

vibration amplitude determining means for determining, based on a plurality of said vibration signals obtained from said plurality of vibration signal detecting means, vibration amplitudes in a plurality of predetermined directions defined by a plurality of straight lines connecting together locations of respective vibration signal detecting means;

cross-correlation function determining means for determining cross-correlation functions of vibration amplitudes in said plurality of directions based on said vibration amplitudes in said predetermined directions;

vibration propagation time difference determining means for determining vibration propagation time difference in said plurality of directions based on said cross-correlation functions in said plurality of directions; and output means for outputting, as vector data, said vibration propagation time difference in said plurality of directions so as to obtain vector data representing a direction of said physical defect on said buried pipe.

22. The apparatus according to claim 21, wherein said vibration propagation time difference determining means comprises:

means for determining a time when said cross-correlation functions of said vibration amplitudes in said plurality of directions become maximal; and means for determining, based on that determined time, respective signal propagation time differences.

23. The apparatus according to claim 21, further comprising means for forcibly striking said buried pipe.

* * * * *